US012774371B2

(12) United States Patent
Kim et al.

(10) Patent No.: US 12,774,371 B2
(45) Date of Patent: Oct. 27, 2026

(54) THERMOPLASTIC RESIN COMPOSITION AND MOLDED ARTICLE

(71) Applicant: LG CHEM, LTD., Seoul (KR)

(72) Inventors: Hong Jin Kim, Daejeon (KR); Sang Rock Lee, Daejeon (KR); Sun Mo Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 754 days.

(21) Appl. No.: 17/911,337

(22) PCT Filed: Sep. 16, 2021

(86) PCT No.: PCT/KR2021/012713

§ 371 (c)(1),
(2) Date: Sep. 13, 2022

(87) PCT Pub. No.: WO2022/092568

PCT Pub. Date: May 5, 2022

(65) Prior Publication Data

US 2023/0129441 A1 Apr. 27, 2023

(30) Foreign Application Priority Data

Oct. 29, 2020 (KR) ........................ 10-2020-0141892
Sep. 15, 2021 (KR) ........................ 10-2021-0122959

(51) Int. Cl.

*C08J 5/04* (2006.01)
*B29C 48/36* (2019.01)
*B29K 77/00* (2006.01)
*B29K 309/08* (2006.01)
*C03C 3/087* (2006.01)
*C08K 3/40* (2006.01)
*C08K 7/14* (2006.01)

(52) U.S. Cl.

CPC ............... *C08J 5/043* (2013.01); *B29C 48/36* (2019.02); *C03C 3/087* (2013.01); *C08K 3/40* (2013.01); *C08K 7/14* (2013.01); *B29K 2077/10* (2013.01); *B29K 2309/08* (2013.01); *C08J 2377/10* (2013.01); *C08K 2201/003* (2013.01)

(58) Field of Classification Search

None
See application file for complete search history.

(56) References Cited

U.S. PATENT DOCUMENTS

2008/0194751 A1 8/2008 Rexin et al.
2011/0240930 A1 10/2011 Stoeppelmann et al.
2014/0066560 A1 3/2014 Stoppelmann et al.
2014/0066561 A1 3/2014 Pfleghar et al.
2015/0274935 A1* 10/2015 Hewel .................. C08K 5/1345 524/291
2016/0102203 A1 4/2016 Koch et al.
2017/0240727 A1* 8/2017 Van Der Burgt ....... C08L 77/06
2018/0298191 A1 10/2018 Schubert et al.
2019/0055356 A1 2/2019 Aepli et al.
2019/0055405 A1* 2/2019 Aepli ...................... B32B 27/34
2020/0079919 A1 3/2020 Tsuchigane et al.

FOREIGN PATENT DOCUMENTS

| | | | | | |
|---|---|---|---|---|---|
| CN | 105504789 | A | | 4/2016 | |
| CN | 109777099 | A | * | 5/2019 | |
| EP | 3130633 | A1 | | 2/2017 | |
| EP | 3222649 | A1 | | 9/2017 | |
| JP | 2994919 | B2 | | 10/1999 | |
| JP | 2015-105359 | A | | 6/2015 | |
| JP | 5902131 | B2 | | 3/2016 | |
| JP | 2017-052974 | A | | 3/2017 | |
| JP | 6678902 | B2 | | 3/2020 | |
| KR | 10-2010-0027292 | A | | 3/2010 | |
| KR | 10-2010-0070679 | A | | 6/2010 | |
| KR | 10-2013-0078602 | A | | 7/2013 | |
| KR | 10-2015-0026533 | A | | 3/2015 | |
| KR | 10-1626783 | B1 | | 6/2016 | |
| KR | 10-1660242 | B1 | | 9/2016 | |
| KR | 10-2017-0072213 | A | | 6/2017 | |
| KR | 10-2020-0036212 | A | | 4/2020 | |
| KR | 10-2020-0043797 | A | | 4/2020 | |
| KR | 20200043797 | A | * | 4/2020 | ................ C08J 5/04 |
| KR | 10-2020-0073335 | A | | 6/2020 | |
| WO | 2020169547 | A1 | | 8/2020 | |

OTHER PUBLICATIONS

English translation of CN-109777099-A (Year: 2019).*
English translation of KR-20200043797-A (Year: 2020).*
Rech et al., "Towards reliable elastic characterization of glass bead reinforced thermoplastic composites using impulse excitation and conventional testing", Scientific Reports (2026) 16:5979.

* cited by examiner

*Primary Examiner* — Randy P Gulakowski
*Assistant Examiner* — Audra J Destefano
(74) *Attorney, Agent, or Firm* — BRYAN CAVE LEIGHTON PAISNER LLP

(57) ABSTRACT

The present invention relates to a thermoplastic resin composition and a molded article manufactured using the same. The present invention has an effect of providing a thermoplastic resin composition that has significantly improved tensile strength, is lightweight, and is suitable for replacing metal parts while maintaining impact strength, elongation, and processability equal or superior to those of a conventional polyamide composite material and a molded article manufactured using the thermoplastic resin composition.

10 Claims, No Drawings

THERMOPLASTIC RESIN COMPOSITION AND MOLDED ARTICLE

The present application is a National Phase entry pursuant to 35 U.S.C. § 371 of International Application No. PCT/KR2021/012713 filed Sep. 16, 2021, and claims priority to and the benefit of Korean Patent Application No. 10-2020-0141892, filed on Oct. 29, 2020, and Korean Patent Application No. 10-2021-0122959, filed on Sep. 15, 2021, in the Korean Intellectual Property Office, the disclosures of each of which are incorporated herein by reference in their entirety.

FIELD

The present invention relates to a thermoplastic resin composition and a molded article manufactured using the same. More particularly, the present invention relates to a thermoplastic resin composition that has significantly improved tensile strength, is lightweight, is suitable for replacing metal parts while maintaining impact strength, elongation, and has processability equal or superior to those of a conventional polyamide composite material, as well as a molded article manufactured using the thermoplastic resin composition.

BACKGROUND

When metals such as aluminum alloys or magnesium alloys are used as materials for automobile parts, there are disadvantages such as specific gravity, post-processing, price fluctuations, and environmental problems.

Accordingly, research on replacing the material of automobile parts with plastics is being actively conducted to reduce weight and reduce manufacturing costs. Polyamide resins having excellent mechanical strength, moldability, and long-term physical properties are attracting attention as alternative materials.

To apply polyamide resins as materials for automobile safety parts instead of metals such as aluminum and iron, research on polyamide composite materials including reinforcing fibers such as glass fiber (GF), aramid fiber (AF), and carbon fiber (CF) is in progress.

However, carbon fiber (CF) has the disadvantage of low impact strength to be applied as a material for automobile structures. Glass fiber (GF) that can impart impact strength is composed of various components such as silica, alumina, calcium oxide, and magnesia, and exhibits different performance depending on the composition thereof. Therefore, there is an urgent need to develop a polyamide resin composition capable of providing performance specific for applications.

Patent Documents

KR 1626783 B1

SUMMARY

Therefore, the present invention has been made in view of the above problems, and it is one object of the present invention to provide a thermoplastic resin composition that has significantly improved tensile strength, is lightweight, is suitable for replacing metal parts while maintaining impact strength, elongation, and has processability equal or superior to those of a conventional polyamide composite material and a molded article manufactured using the thermoplastic resin composition.

The above and other objects can be accomplished by the present invention described below.

In accordance with one aspect of the present invention, provided is a thermoplastic resin composition, including:

20 to 64% by weight of a non-aromatic polyamide resin having a glass transition temperature (Tg) of 50 to 60° C. and a melting temperature (Tm) of 240 to 265° C.; 36 to 80% by weight of glass fiber having a silica content of 52 to 66% by weight; and 0 to 30% by weight of an aromatic polyamide resin, wherein the thermoplastic resin composition has a room temperature tensile strength of 270 MPa or more as measured according to standard measurement ISO 527.

When a glass transition temperature (Tg) of the non-aromatic polyamide resin is identified as "a", a glass transition temperature (Tg) of the aromatic polyamide resin is identified as "b", a melting temperature (Tm) of the non-aromatic polyamide resin is identified as "c", and a content of silica contained in the glass fiber is identified as "d", the thermoplastic resin composition may satisfy Equations 1 to 3 below.

$$4.8a \leq c \leq 5.3a, \quad \text{[Equation 1]}$$

$$2d \leq b \leq 2.5d, \text{ and} \quad \text{[Equation 2]}$$

$$a < b < c, \quad \text{[Equation 3]}$$

wherein a, b, c, and d satisfy $50 \leq a \leq 60$, $106 \leq b \leq 150$, $240 \leq c \leq 265$, and $52 \leq d \leq 66$, respectively.

The glass fiber may include 52 to 66% by weight of silica, 12 to 21% by weight of alumina, 0.5 to 24% by weight of calcium oxide, 12% by weight or less of magnesia, 0 to 8% by weight of boron trioxide, 3% by weight or less of titanium dioxide, 0 to 0.6% by weight of $Fe_2O_3$, 0 to 8% by weight of boron oxide, 0 to 0.7% by weight of fluorine (F), and 0.8% by weight or less in sum of sodium oxide and potassium oxide.

The glass fiber may include 58 to 62% by weight of silica, 14 to 18% by weight of alumina, 10 to 13% by weight of calcium oxide, 8 to 10% by weight of magnesia, 0.5 to 2% by weight of titanium dioxide, 0.8% by weight or less in sum of sodium oxide and potassium oxide, and 0.5% by weight or less of $Fe_2O_3$.

The glass fiber may include 52 to 56% by weight of silica, 12 to 16% by weight of alumina, 20 to 24% by weight of calcium oxide, 1.5% by weight or less of magnesia, 1% by weight or less of titanium dioxide, 0.8% by weight or less in sum of sodium oxide and potassium oxide, 0.4% by weight or less of $Fe_2O_3$, 5 to 8% by weight of boron oxide, and 0.7% by weight or less of fluorine (F).

The glass fiber may contain 17 to 24% by weight in sum of calcium oxide and magnesium, and have a circular cross section.

The glass fiber may contain 21 to 25% by weight in sum of calcium oxide and magnesium, and have a non-circular cross section.

The glass fiber may have an aspect ratio of 1:1 to 1:4 expressed as a ratio (L/D) of length (L) to diameter (D). In this case, the diameter (D) may be an average diameter of 6 to 16 μm.

The non-aromatic polyamide resin may be an aliphatic polyamide. As a specific example, the non-aromatic polyamide resin may have a unit represented by Chemical Formula 1 below, a relative viscosity of 2.3 to 2.8, and an amorphous content of 50 to 60% by weight, wherein the unit is repeated 50 to 500 times, L is $(CH_2)_n$, and n is an integer of 3 to 6.

[Chemical Formula 1]

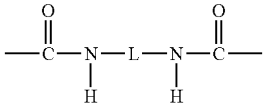

The non-aromatic polyamide resin may be polyhexamethylene adipamide (PA66), and may be included in an amount of 25 to 60% by weight, based on a total weight of the thermoplastic resin composition.

The aromatic polyamide resin may be PA MACM12, PA PACM12, or a mixture or copolyamide thereof, or may be an amorphous resin selected from polyhexamethylene isophthalamide (PA6I), PAMXDI, and PA6I/MXDI.

The aromatic polyamide resin may be polyhexamethylene isophthalamide (PA6I), and may be included in an amount of 4 to 25% by weight, based on a total weight of the thermoplastic resin composition.

The thermoplastic resin composition may further include one or more additives selected from a flame retardant, a nucleating agent, a heat stabilizer, a light stabilizer, a lubricant, an antioxidant, and a thickener.

The thermoplastic resin composition may include 40 to 60% by weight of the non-aromatic polyamide resin; 40 to 60% by weight of the glass fiber; and 0 to 5% by weight of additives, and may have a specific gravity of 1.45 to 1.70 $g/cm^3$, an impact strength of 18.5 to 22.5 $kJ/m^2$, an elongation of 2.5 to 3.3% as measured in a marked section of 50 mm according to ISO 527, and a specific gravity of 1.45 to 1.70 $g/cm^3$.

The thermoplastic resin composition may include 30 to 60% by weight of the non-aromatic polyamide resin; 40 to 70% by weight of the glass fiber; and 0 to 5% by weight of additives, and may have a specific gravity of 1.45 to 1.85 $g/cm^3$, an impact strength of 18.5 to 22.5 $kJ/m^2$, an elongation of 1.9 to 3.3% as measured in a marked section of 50 mm according to ISO 527.

The thermoplastic resin composition may include 25 to 45% by weight of the non-aromatic polyamide resin; 4 to 25% by weight of the aromatic polyamide resin; 50 to 60% by weight of the glass fiber; and 0 to 5% by weight of additives, and may have an elongation of 2.3 to 2.9% as measured in a marked section of 50 mm according to ISO 527.

The thermoplastic resin composition may include 20 to 36% by weight of the non-aromatic polyamide resin; 4 to 20% by weight of the aromatic polyamide resin; 60% by weight of the glass fiber; and 0 to 5% by weight of additives, and may have a room temperature tensile strength of 270 MPa or more as measured according to standard measurement ISO 527, an elongation of 2.2 to 2.5% as measured in a marked section of 50 mm according to ISO 527, and a glass fiber orientation of 225 to 250 MPa in the flow direction and 120 to 165 MPa in the perpendicular direction (TD) as measured at a speed of 5 mm/min using a specimen having a thickness of 3.2 mm and a width of 12.7 mm according to ASTM D638 Type 1. The values of 225 to 250 MPa are the measurement results of physical properties according to glass fiber orientation (unit: MPa) for MD (flow direction) and TD (perpendicular direction) according to ASTM D638 Type 1.

When room temperature tensile strength according to standard measurement ISO 527 is identified as "a", elongation in a marked section of 50 mm according to ISO 527 is identified as "b", and a difference between the measured properties along a flow direction (MD) and a perpendicular direction (TD) of glass fiber as measured at a speed of 5 mm/min using a specimen having a thickness of 3.2 mm and a width of 12.7 mm according to ASTM D638 Type 1 is identified as "c", in equation "a+b/c", the thermoplastic resin composition may have a calculated value of 2.88 or more.

When a physical property degradation rate (%) is calculated using room temperature (23° C.) tensile strength and high temperature (90° C.) tensile strength according to standard measurement ISO 527, the thermoplastic resin composition may satisfy Equation 1 below.

$$34 \leq 100-(\text{high temperature measurement value/room temperature measurement value} \times 100) \leq 44 \qquad \text{[Equation 1]}$$

In accordance with another aspect of the present invention, provided is a method of preparing a thermoplastic resin composition, the method including:

melt-kneading and extruding 20 to 64% by weight of a non-aromatic polyamide resin having a glass transition temperature (Tg) of 50 to 60° C. and a melting temperature (Tm) of 240 to 265° C.; 36 to 80% by weight of glass fiber having a silica content of 52 to 66% by weight; and 0 to 30% by weight of an aromatic polyamide resin, wherein the thermoplastic resin composition has a room temperature tensile strength of 270 MPa or more as measured according to standard measurement ISO 527.

In accordance with yet another aspect of the present invention, provided is a molded article manufactured using the above-described thermoplastic resin composition.

The molded article may be a high-rigidity, high-toughness lightweight automotive part. The present invention has an effect of providing a thermoplastic resin composition that has significantly improved tensile strength, is lightweight, and is suitable for replacing metal parts while maintaining impact strength, elongation, and has processability equal or superior to those of a conventional polyamide composite material, as well as a molded article manufactured using the thermoplastic resin composition Therefore, the thermoplastic resin composition and the molded article according to the present invention can be widely applied to automobile parts. Specifically, the thermoplastic resin composition and the molded article can be applied to materials for automobile safety parts, including seat belts and airbags which are subjected to strong force and pressure while driving or in emergency situations such as accidents, vehicle information guide displays, instrument panels, and metal replacement materials for digital cockpits.

DETAILED DESCRIPTION

Hereinafter, the present invention will be described in detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

When a thermoplastic resin composition according to the present invention was prepared by including a non-aromatic polyamide resin having specified glass transition temperature and melting temperature, an aromatic polyamide resin, and glass fiber in a specific composition ratio, and the thermoplastic resin composition had a tensile strength of 270 MPa or more as measured according to standard measurement ISO 527, considering product design and design change at the same time, high rigidity, weight reduction, and appearance of the thermoplastic resin composition were secured enough to replace existing metals. In addition, when the thermoplastic resin composition was prepared, a predetermined nucleating agent, a flame retardant, and a thickener could be optionally included when necessary. In this case, the thermoplastic resin composition had greatly improved tensile strength, was lightweight, and was suitable for replacing metal parts while maintaining impact strength, elongation, and has processability equal or superior to those of a conventional polyamide composite material. Based on these results, the present inventors conducted further studies to complete the present invention.

The thermoplastic resin composition of the present invention includes 20 to 64% by weight of a non-aromatic polyamide resin having a glass transition temperature (Tg) of 50 to 60° C. and a melting temperature (Tm) of 240 to 265° C.; 36 to 80% by weight of glass fiber having a silica content of 52 to 66% by weight; and 0 to 30% by weight of an aromatic polyamide resin, and has a room temperature tensile strength of 270 MPa or more as measured according to standard measurement ISO 527. In this case, there is an advantage of providing a thermoplastic resin composition that has greatly improved tensile strength, is lightweight, and is suitable for replacing metal parts while maintaining impact strength, elongation, and processability equal or superior to those of a conventional polyamide composite material.

In addition, the thermoplastic resin composition of the present invention includes 20 to 64% by weight of a non-aromatic polyamide resin having a glass transition temperature (Tg) of 50 to 60° C. and a melting temperature (Tm) of 240 to 265° C.; 36 to 80% by weight of glass fiber containing a silica content of 52 to 66% by weight and having a circular cross section or a non-circular cross section; and 0 to 30% by weight of an aromatic polyamide resin, wherein the glass fiber includes 52 to 66% by weight of silica, 12 to 21% by weight of alumina, 0.5 to 24% by weight of calcium oxide, 12% by weight or less of magnesia, 0 to 8% by weight of boron trioxide, 3% by weight or less of titanium dioxide, 0 to 0.6% by weight of $Fe_2O_3$, 0 to 8% by weight of boron oxide, 0 to 0.7% by weight of fluorine (F), and 0.8% by weight or less in sum of sodium oxide and potassium oxide, and has a room temperature tensile strength of 270 MPa or more as measured according to standard measurement ISO 527. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

In addition, the thermoplastic resin composition of the present invention includes 20 to 64% by weight of a non-aromatic polyamide resin having a glass transition temperature (Tg) of 50 to 60° C. and a melting temperature (Tm) of 240 to 265° C.; 36 to 80% by weight of glass fiber containing a silica content of 52 to 66% by weight and having a circular cross section or a non-circular cross section; and 0 to 30% by weight of an aromatic polyamide resin, wherein the glass fiber includes 52 to 66% by weight of silica, 12 to 21% by weight of alumina, 0.5 to 24% by weight of calcium oxide, 12% by weight or less of magnesia, 0 to 8% by weight of boron trioxide, 3% by weight or less of titanium dioxide, 0 to 0.6% by weight of $Fe_2O_3$, 0 to 8% by weight of boron oxide, 0 to 0.7% by weight of fluorine (F), and 0.8% by weight or less in sum of sodium oxide and potassium oxide, and the non-aromatic polyamide resin includes 25 to 60% by weight of polyhexamethylene adipamide (PA66) based on a total weight of the thermoplastic resin composition and has a room temperature tensile strength of 270 MPa or more as measured according to standard measurement ISO 527. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

In addition, the thermoplastic resin composition of the present invention preferably includes 20 to 64% by weight of a non-aromatic polyamide resin having a glass transition temperature (Tg) of 50 to 60° C. and a melting temperature (Tm) of 240 to 265° C.; 36 to 80% by weight of glass fiber containing a silica content of 52 to 66% by weight and having a circular cross section or a non-circular cross section; and 0 to 30% by weight of an aromatic polyamide resin, wherein the glass fiber includes 52 to 66% by weight of silica, 12 to 21% by weight of alumina, 0.5 to 24% by weight of calcium oxide, 12% by weight or less of magnesia, 0 to 8% by weight of boron trioxide, 3% by weight or less of titanium dioxide, 0 to 0.6% by weight of $Fe_2O_3$, 0 to 8% by weight of boron oxide, 0 to 0.7% by weight of fluorine (F), and 0.8% by weight or less in sum of sodium oxide and potassium oxide, includes 4 to 25% by weight of the polyhexamethylene isophthalamide (PA6I), based on a total weight of the thermoplastic resin composition, and has a room temperature tensile strength of 270 MPa or more as measured according to standard measurement ISO 527. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

Hereinafter, each component constituting the thermoplastic resin composition of the present invention will be described in detail as follows.

Non-Aromatic Polyamide Resin

In one embodiment of the present invention, the non-aromatic polyamide resin has a structure not including an aromatic ring in a main chain, and is prepared by polycondensation of monomers composed of an aliphatic dicarboxylic acid and an aliphatic or alicyclic diamine.

For example, the aliphatic dicarboxylic acid may have 5 to 7 carbon atoms, preferably 6 carbon atoms.

For example, the aliphatic or alicyclic diamine may have 6 to 20 carbon atoms.

For example, the non-aromatic polyamide resin may be an aliphatic polyamide. As a specific example, the non-aromatic polyamide resin may have a unit represented by Chemical Formula 1 below, wherein the unit is repeated 50 to 500 times, L is $(CH_2)_n$, and n is an integer of 3 to 6. In addition, the non-aromatic polyamide resin may be a semi-crystalline substance, an amorphous substance, or a mixture thereof.

[Chemical Formula 1]

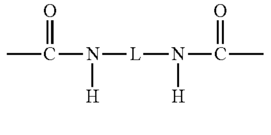

In addition, the non-aromatic polyamide resin may have a unit represented by urethane bond-linker-urethane bond. In this case, the linker may be $(CH_2)_6$, the unit is repeated 50 to 500 times, and the non-aromatic polyamide resin may be a semi-crystalline substance, an amorphous substance, or a mixture thereof.

In this description, amorphous polymers are defined as polymers that do not produce crystallization (exothermic) or melting (endothermic) peaks during differential scanning calorimetry (DSC) testing in a temperatures range from a glass transition temperature (Tg) to Tg+300° C. Conversely, when these peaks are recorded during DSC testing, the polymer material is a crystalline or semi-crystalline polymer. The DSC test is known to those skilled in the art.

In this description, the non-aromatic polyamide resin (A) does not contain aromatics and does not contain a certain amount of an amorphous substance, but the amorphous substance substantially occupies the majority of the resin. For example, the non-aromatic polyamide resin (A) may have an amorphous content of 50 to 60% by weight. When the non-aromatic polyamide resin has an amorphous content within this range, a thermoplastic resin composition having excellent balance between mechanical properties and moldability may be secured.

In the present invention, a crystalline polymer and an amorphous polymer are defined as a polymer that produces crystallization (exothermic) or melting (endothermic) peaks, and a polymer that do not produce crystallization (exothermic) or melting (endothermic) peaks, in differential scanning calorimetry (DSC) testing in a temperature range from glass transition temperature (Tg) to Tg+300° C., respectively.

As a specific example, the non-aromatic polyamide resin may be polyhexamethylene adipamide (PA66).

For example, the non-aromatic polyamide resin may have a glass transition temperature of 50 to 60° C., preferably 52 to 58° C. Within this range, due to excellent heat resistance, the tensile strength of a molded article manufactured by molding the thermoplastic resin composition of the present invention may be improved.

For example, the non-aromatic polyamide resin may have a melting temperature (Tm) of 240 to 265° C., preferably 245 to 265° C. Within this range, due to excellent heat resistance and processability, the tensile strength of a molded article manufactured by molding the thermoplastic resin composition of the present invention may be improved.

In the present invention, glass transition temperature (Tg) and melting temperature (Tm) may be measured by DSC. For example, when using DSC7 (Perkin-Elmer Co.) to maintain temperature at 330° C. for 5 minutes, decreasing the temperature to 23° C. at a rate of 10° C./min, and then increasing the temperature at a rate of 10° C./min, melting temperature (Tm) refers to an endothermic peak when melting.

The non-aromatic polyamide resin of the present invention may have a glass transition temperature (Tg) of 50 to 60° C. or 52 to 60° C. and a melting temperature (Tm) of 240 to 265° C. or 245 to 265° C. Within this range, considering product design and design change at the same time, high rigidity, weight reduction, and appearance may be secured enough to replace existing metals.

The non-aromatic polyamide resin may have a relative viscosity of 2.3 to 2.8, preferably 2.3 to 2.7 as measured using 96 wt % sulfuric acid as a solvent at a resin concentration of 1.0 w/v % in solution according to sulfuric RV.

For example, the relative viscosity ($\eta_{ref}$) is measured at 20° C. using 0.5% by weight of an m-cresol solution according to DIN EN ISO 307.

For example, based on the total weight of the resin composition, the non-aromatic polyamide resin may be included in an amount of 20 to 64% by weight, 20 to 60% by weight, 20 to 45% by weight, 20 to 40% by weight, 25 to 64% by weight, 30 to 64% by weight, 35 to 60% by weight, 40 to 64% by weight, or 40 to 60% by weight. When the non-aromatic polyamide resin is included in an amount within this range, a thermoplastic resin composition having excellent physical property balance between processability, specific gravity, and mechanical properties may be secured, and a high-rigidity, high-toughness molded article capable of replacing metals may be manufactured using the thermoplastic resin composition.

Glass Fiber

In the present invention, glass fiber is included to increase the mechanical properties, heat resistance, and dimensional stability of a polyamide resin composition.

When the inorganic glass fiber is included in the thermoplastic resin composition, the mechanical properties, such as tensile strength, impact strength, and elongation, and heat resistance of a molded article manufactured using the resin composition may be improved.

In particular, in the field of molding parts using the thermoplastic resin composition of the present invention, securing fluidity of the resin composition is the key.

A specific glass material is included in the glass fiber to improve the moldability of the polyamide resin composition of the present invention. For example, when using the above-mentioned specific glass material in the field of molding parts for automobile seat belts, processability and moldability may be sufficiently secured while maintaining sufficient heat resistance and mechanical properties of a base resin.

For example, the glass fiber may have a circular or non-circular cross section. When circular glass fiber having a circular cross section is used, in the terms of high rigidity and elongation, an effect of replacing metals may be provided.

In addition, when flat glass fiber having an oval or irregular cross section, defects in surface appearance due to protrusion of glass fiber or traces of gas flow during injection molding may be reduced. In addition, when manufacturing a product, it is possible to consider physical property deviation according to the orientation of glass fiber for each part, and advantages in terms of flatness and deformation may be obtained.

In this description, the circular, oval, and irregular cross-sections are not particularly limited when they are circular, oval, and irregular cross-sections commonly recognized in the art to which the present invention pertains.

In this description, a circular cross section shows a circular shape and refers to a case in which a dimensional ratio of a main cross-sectional axis to a secondary cross-sectional axis is close to 1 or equal to 1, but the present invention is not limited thereto.

In this description, an oval cross section shows an oval shape and refers to a case in which a dimensional ratio of a main cross-sectional axis to a secondary cross-sectional axis is 2:6, 3:6, or 3.5:5.0, but the present invention is not limited thereto.

In this description, an irregular cross section refers to a case in which a cross section is not round or oval, but the present invention is not limited thereto.

In one embodiment of the present invention, the glass fibers may be used in combination with other inorganic fiber, and the other inorganic fiber includes one or more selected from carbon fiber, basalt fiber, and natural fiber, such as kenaf or hemp.

The glass fiber of the present invention may be glass fiber having a circular cross section or a non-circular cross section and including a silica content of 52% by weight or more, or 52 to 66% by weight. In this case, considering product design and design change at the same time, high rigidity, weight reduction, and appearance may be secured enough to replace existing metals.

For example, the glass fiber may have an aspect ratio of 1:1 to 1:4, as a specific example, 1:1 to 1:3, as a more specific example, 1:1, expressed as the ratio (L/D) of length (L) to diameter (D). In this case, the thermoplastic resin composition of the present invention may provide high rigidity, high toughness, elongation, and improvement in surface appearance. As a more specific example, when the glass fiber may have an aspect ratio of 1:3 to 1:4, more specifically, 1:4, a product advantageous in terms of high rigidity, high toughness, flatness, deformation, and orientation may be provided.

In this description, diameter and length may be measured using a scanning electron microscope (SEM). Specifically, using a scanning electron microscope, 20 inorganic fillers are selected, the diameter and length of each inorganic filler are measured using an icon bar that can measure the diameter, and then arithmetic averages are calculated to obtain an average diameter and an average length.

For example, the D may have an average diameter of 6 to 16 μm, preferably 7 to 11 μm, more preferably 10 to 11 μm. Within this range, through improvement of processability, the tensile strength of a molded article manufactured by molding the thermoplastic resin composition of the present invention may be improved.

According to one embodiment of the present invention, for example, the glass fiber includes 52 to 66% by weight of silica, 12 to 21% by weight of alumina, 0.5 to 24% by weight of calcium oxide, 12% by weight or less or 8 to 12% by weight of magnesia, 0 to 8% by weight of boron trioxide, 3% by weight or less of titanium dioxide, 0 to 0.6% by weight of $Fe_2O_3$, and 0.8% by weight or less in sum of sodium oxide and potassium oxide. In this case, a thermoplastic resin composition having excellent physical property balance between processability, specific gravity, and mechanical properties may be secured, and a high-rigidity, high-toughness molded article capable of replacing metals may be manufactured using the thermoplastic resin composition.

The glass fiber includes 52 to 66% by weight of silica, 12 to 21% by weight of alumina, 0.5 to 24% by weight of calcium oxide, 12% by weight or less of magnesia, 0 to 8% by weight of boron trioxide, 3% by weight or less of titanium dioxide, 0 to 0.6% by weight of $Fe_2O_3$, 0 to 8% by weight of boron oxide, 0 to 0.7% by weight of fluorine (F), and 0.8% by weight or less in sum of sodium oxide and potassium oxide. In this case, a thermoplastic resin composition having excellent physical property balance between processability, specific gravity, and mechanical properties may be secured, and a high-rigidity, high-toughness molded article capable of replacing metals may be manufactured using the thermoplastic resin composition.

The glass fiber includes 58 to 62% by weight of silica, 14 to 18% by weight of alumina, 10 to 13% by weight of calcium oxide, 8 to 10% by weight of magnesia, 0.5 to 2% by weight of titanium dioxide, 0.8% by weight or less in sum of sodium oxide and potassium oxide, and 0.5% by weight or less of $Fe_2O_3$. In this case, a thermoplastic resin composition having excellent physical property balance between processability, specific gravity, and mechanical properties may be secured, and a high-rigidity, high-toughness molded article capable of replacing metals may be manufactured using the thermoplastic resin composition.

The glass fiber includes 52 to 56% by weight of silica, 12 to 16% by weight of alumina, 20 to 24% by weight of calcium oxide, 1.5% by weight or less of magnesia, 1% by weight or less of titanium dioxide, 0.8% by weight or less in sum of sodium oxide and potassium oxide, 0.4% by weight or less of $Fe_2O_3$, 5 to 8% by weight of boron oxide, and 0.7% by weight or less of fluorine (F). In this case, a thermoplastic resin composition having excellent physical property balance between processability, specific gravity, and mechanical properties may be secured, and a high-rigidity, high-toughness molded article capable of replacing metals may be manufactured using the thermoplastic resin composition.

The glass fiber may be circular glass fiber containing 17 to 24% by weight in sum of calcium oxide and magnesium and having a circular cross section. In this case, a thermoplastic resin composition having excellent physical property balance between processability, specific gravity, and mechanical properties may be secured, and a high-rigidity, high-toughness molded article capable of replacing metals may be manufactured using the thermoplastic resin composition.

The glass fiber may be flat glass fiber containing 21 to 25% by weight in sum of calcium oxide and magnesium and having a non-circular cross section. In this case, a thermoplastic resin composition having excellent physical property balance between processability, specific gravity, and mechanical properties may be secured, and a high-rigidity, high-toughness molded article capable of replacing metals may be manufactured using the thermoplastic resin composition.

As a specific example, the glass fiber may be represented by the general formula AaBbCcDd.

For reference, when glass fiber sold as a product is of a general-purpose grade, the glass fiber exhibits a characteristic of $d \leq 1.5$ in the above-described general formula. When glass fiber is of an ultra-high-rigidity grade, the glass fiber exhibits a characteristic of $0.5 \leq c \leq 5$. When glass fiber is of another general-purpose grade, the glass fiber exhibits a characteristic of $20 \leq c \leq 24$, $2 \leq d \leq 5$, and $22 \leq c+d \leq 29$, showing different compositions.

Contrary to what is known in the art, through Examples to be described later, in the case of the thermoplastic resin composition of the present invention, in terms of tensile strength and injection moldability, it was confirmed that glass fibers with a circular cross-section and a high rigidity grade, or glass fibers with a non-circular (flat) cross-section and a general rigidity grade are preferably used rather than an ultra-high rigidity grade.

In one embodiment of the present invention, in fiber manufacturing or post-treatment processes, the glass fiber may be treated with glass fiber sizing compositions. The glass fiber sizing compositions may include lubricants, coupling agents, and surfactants.

The lubricant is mainly used to form good strands in the manufacture of glass fiber, and the coupling agent enables good adhesion between the glass fiber and the polyamide resin. When the types of polyamide resin and glass fiber are properly selected, excellent physical properties may be imparted to a glass fiber-reinforced polyamide resin composition.

Methods of using the coupling agent include a method of directly treating the glass fiber with the coupling agent, a method of adding the coupling agent to an organic matrix, and the like. To fully exhibit the performance of the coupling agent, content thereof should be appropriately determined.

For example, the coupling agent may include amine-based, acrylic-based, and γ-aminopropyltriethoxysilane, γ-aminopropyltrimethoxysilane, N-(beta-aminoethyl) γ-aminopropyltriethoxysilane, γ-methacryloxypropyl triethoxysilane, γ-glycidoxypropyl trimethoxysilane.

For example, based on the total weight of the resin composition, the glass fiber may be included in an amount of 36 to 80% by weight, 40 to 70% by weight, 50 to 60% by weight, or 60 to 65% by weight. Within this range, considering product design and design change at the same time, high rigidity, weight reduction, and appearance may be secured enough to replace existing metals.

Aromatic Polyamide Resin

When necessary, the thermoplastic resin composition of the present invention may include an aromatic polyamide resin.

For example, the aromatic polyamide resin includes an excess of phthalamide, preferably an isophthalic acid-derived amide, and thus exhibits an amorphous structure in which crystallization hardly proceeds. In this case, compatibility with the non-aromatic polyamide resin may be provided, and a bonding site into which the above-described glass fiber may be efficiently added may be provided, thus maximizing a glass fiber input effect.

In this description, the aromatic polyamide resin does not contain a certain amount of an amorphous substance, but the amorphous substance substantially occupies the majority of the resin. For example, the aromatic polyamide resin has an amorphous content of 90% by weight or more.

In addition, the aromatic polyamide resin may have a glass transition temperature of 106 to 150° C., preferably 106 to 133° C., more preferably 117 to 120° C. as measured using a DSC. Within this range, excellent heat resistance and processability may be provided, and thus the tensile strength of a molded article manufactured by molding the thermoplastic resin composition of the present invention may be improved.

The aromatic polyamide resin may be PA MACM12, PA PACM12, or a mixture or copolyamide thereof, or may be an amorphous resin selected from polyhexamethylene isophthalamide (PA6I), PAMXDI, and PA6I/MXDI.

As a specific example, the aromatic polyamide resin may be polyhexamethylene isophthalamide (PA6I).

For example, based on a total weight of the resin composition, the aromatic polyamide resin may be included in an amount of 0 to 30% by weight, 30% by weight or less, 4 to 25% by weight, or 4 to 20% by weight. When the aromatic polyamide resin is included in an amount within the range, excellent mechanical properties, such as rigidity and processability, may be implemented.

When the glass transition temperature (Tg) of the non-aromatic polyamide resin is identified as "a", the glass transition temperature (Tg) of the aromatic polyamide resin is identified as "b", the melting temperature (Tm) of the non-aromatic polyamide resin is identified as "c", and the content of silica contained in the glass fiber is identified as "d", the thermoplastic resin composition may satisfy Equations 1 to 3 below.

$$4.8a \leq c \leq 5.3a, \quad \text{[Equation 1]}$$

$$2d \leq b \leq 2.5d, \text{ and} \quad \text{[Equation 2]}$$

$$a < b < c, \quad \text{[Equation 3]}$$

wherein a, b, c, and d satisfy $50 \leq a \leq 60$, $106 \leq b \leq 150$, $240 \leq c \leq 265$, and $52 \leq d \leq 66$, respectively.

Additives

In one embodiment of the present invention, for example, the thermoplastic resin composition may include one or more selected from a flame retardant, a nucleating agent, a heat stabilizer, a light stabilizer, a lubricant, an antioxidant, and a thickener.

As the flame retardant according to the present invention, various known flame retardants may be used as long as the flame retardants do not adversely affect the thermoplastic resin composition of the present invention. Clariant Exolit-OP-1230, which is a representative commercially available flame retardant, may be used.

As the nucleating agent according to the present invention, various known nucleating agents may be used as long as the nucleating agents do not adversely affect the thermoplastic resin composition of the present invention. BRUGGOLEN_P22, which is a representative commercially available nucleating agent, may be used.

As the thickener according to the present invention, various known thickeners may be used as long as the thickeners do not adversely affect the thermoplastic resin composition of the present invention. Xibond250, which is a representative commercially available thickener, may be used.

As the antioxidant according to the present invention, various known antioxidants may be used as long as the antioxidants do not adversely affect the thermoplastic resin composition of the present invention.

The lubricant according to the present invention may be lignite-derived mineral wax or olefin wax, and serves to maintain excellent releasability and injection property of the thermoplastic resin composition.

The olefin wax is a polymer having a low melt viscosity and may be an oil-based solid having sliding properties and plasticity. For example, the olefin wax may include one or more selected from polyethylene wax and polypropylene wax, and commercially available products may be used.

The mineral wax has thermal stability due to high melting point and hardness thereof, and may include one or more selected from OP and E grades. Commercially available products may be used as long as the products follows the definition of the present invention.

In one embodiment of the present invention, based on a total weigh of the thermoplastic resin composition, the additives may be included in an amount of 5% by weight or less or 0.05 to 3% by weight, preferably 0.01 to 2% by weight. Within this range, excellent releasability and injection property may be provided.

In addition, when necessary, processing aids, pigments, colorants, and the like may be further included.

Thermoplastic Resin Composition

For example, the glass fiber-reinforced polyamide resin composition according to the present invention has a tensile strength of 270 MPa or more as measured according to standard measurement ISO 527.

The tensile strength may be measured in a marked section (elongation measurement) of 50 mm using a specimen having a thickness of 4 mm and a width of 10 mm.

The thermoplastic resin composition may have a room temperature tensile strength of 300 MPa or more as measured according to standard measurement ISO 527 and a high temperature tensile strength of 180 MPa or more as measured at 90° C. In this case, mechanical properties, such as rigidity and processability, may be excellent.

When a physical property degradation rate (%) is calculated using room temperature (23° C.) tensile strength and high temperature (90° C.) tensile strength according to standard measurement ISO 527, the thermoplastic resin composition may satisfy Equation 1 below. In this case, mechanical properties, such as rigidity and processability, may be excellent.

$$34 \leq 100-(\text{high temperature measurement value/room temperature measurement value} \times 100) \leq 44 \quad \text{[Equation 1]}$$

For example, in Equation 1, calculated values may be 34 to 44, preferably 34.5 to 43.9.

When room temperature tensile strength according to standard measurement ISO 527 is identified as "a", elongation in a marked section of 50 mm according to ISO 527 is identified as "b", and the difference between measured properties along the flow direction (MD) and the perpendicular direction (TD) of glass fiber as measured at a speed of 5 mm/min using a specimen having a thickness of 3.2 mm and a width of 12.7 mm according to ASTM D638 Type 1 is identified as "c", in equation "a+b/c", the thermoplastic resin composition may have a calculated value of 2.88 or more, 2.88 to 4.0, or 2.9 to 3.8. In this case, the thermoplastic resin composition may have greatly improved tensile strength, may be lightweight, and may be suitable for replacing metal parts while maintaining impact strength, elongation, and has processability equal or superior to those of a conventional polyamide composite material.

As a specific example, the thermoplastic resin composition may include 31 to 41% by weight of the non-aromatic polyamide resin; 4 to 8% by weight of the aromatic polyamide resin; and 51 to 55% by weight of the silica-reinforced glass fiber; and 0.2 to 6% by weight of the flame retardant. In this case, the thermoplastic resin composition may have greatly improved tensile strength, may be lightweight, and may be suitable for replacing metal parts while maintaining impact strength, elongation, and has processability equal or superior to those of a conventional polyamide composite material.

In addition, the thermoplastic resin composition of the present invention preferably includes 40 to 60% by weight the non-aromatic polyamide resin; 40 to 60% by weight of the glass fiber; and 0 to 5% by weight of additives, and has a specific gravity of 1.45 to 1.70 g/cm$^3$, an impact strength of 18.5 to 22.5 kJ/m$^2$, an elongation of 2.5 to 3.3% as measured in a marked section of 50 mm according to ISO 527, and a specific gravity of 1.45 to 1.70 g/cm$^3$. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

In addition, the thermoplastic resin composition of the present invention preferably includes 30 to 60% by weight of the non-aromatic polyamide resin; 40 to 70% by weight of the glass fiber; and 0 to 5% by weight of additives, and has a specific gravity of 1.45 to 1.85 g/cm$^3$, an impact strength of 18.5 to 22.5 kJ/m$^2$, and an elongation of 1.9 to 3.3% as measured in a marked section of 50 mm according to ISO 527. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

In addition, the thermoplastic resin composition of the present invention preferably includes 25 to 45% by weight of the non-aromatic polyamide resin; 4 to 25% by weight of the aromatic polyamide resin; 50 to 60% by weight of the glass fiber; and 0 to 5% by weight of additives, and has an elongation of 2.3 to 2.9% as measured in a marked section of 50 mm according to ISO 527. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

In addition, the thermoplastic resin composition of the present invention preferably includes 20 to 36% by weight of the non-aromatic polyamide resin; 4 to 20% by weight of the aromatic polyamide resin; 60% by weight of the glass fiber; and 0 to 5% by weight of additives, and has a room temperature tensile strength of 270 MPa or more as measured according to standard measurement ISO 527, an elongation of 2.2 to 2.5% as measured in a marked section of 50 mm according to ISO 527, and properties measured along a glass fiber orientation of 225 to 250 MPa in the flow direction and 120 to 165 MPa in the perpendicular direction (TD) as measured at a speed of 5 mm/min using a specimen having a thickness of 3.2 mm and a width of 12.7 mm according to ASTM D638 Type 1. In this case, there is an advantage of providing a thermoplastic resin composition that has greatly improved tensile strength, is lightweight, and is suitable for replacing metal parts while maintaining impact strength, elongation, and has processability equal or superior to those of a conventional polyamide composite material.

Method of Preparing Thermoplastic Resin Composition

The thermoplastic resin composition according to the present invention may be prepared by a method known in the art. For example, the thermoplastic resin composition may be prepared in the form of pellets by melt-extruding a mixture of each component and other additives using an extruder, and the pellets may be used for injection-molded articles and extrusion-molded articles.

The method of preparing the thermoplastic resin composition shares all the technical characteristics of the above-described thermoplastic resin composition. Accordingly, repeated description thereof will be omitted.

In one embodiment of the present invention, the pellets are extruded at a temperature of 280 to 310° C., wherein the temperature means temperature set in a cylinder.

Extrusion kneaders commonly used in the art to which the present invention pertains may be used without particular limitation, and a twin-screw extrusion kneader is preferably used.

The temperature of a mold during injection is preferably in the range of 90 to 150° C., preferably 100 to 120° C. When the mold temperature is less than 90° C., appearance characteristics may be deteriorated, and the effect of increasing crystallinity and physical properties according to annealing may be insignificant. When the mold temperature exceeds 150° C., pellets stick to a mold, so that releasability is lowered and cooling rate may be increased, and productivity may be greatly reduced in terms of mass production.

For example, the injection process may be performed using an injection machine in which a hopper temperature or a nozzle temperature is set to 290° C. to 305° C.

For example, the method of preparing a thermoplastic resin composition of the present invention includes a step of melt-kneading and extruding a non-aromatic polyamide resin; glass fiber; and a resin composition including a polyphthalamide-based resin and additives.

As a specific example, the method of preparing a thermoplastic resin composition includes a step of melt-kneading and extruding 20 to 64% by weight of a non-aromatic polyamide resin having a glass transition temperature (Tg) of 50 to 60° C. and a melting temperature (Tm) of 240 to 265° C.; 36 to 80% by weight of glass fiber having a silica content of 52 to 66% by weight; and 0 to 30% by weight of an aromatic polyamide resin, wherein the thermoplastic resin composition has a room temperature tensile strength of 270 MPa or more as measured according to standard measurement ISO 527.

<Molded Article>

According to another embodiment of the present invention, a molded article manufactured using the above-described thermoplastic resin composition is provided.

For example, the molded article may be a high-rigidity, high-toughness lightweight automotive part.

As another example, the molded article may be a metal replacement par for automobile seat belts, or may be a vehicle information guide display, an instrument panel, or a metal replacement material for digital cockpits.

For example, the molded article may have a tensile strength of 270 MPa or more, preferably 300 MPa or more as measured according to standard measurement ISO 527.

In addition, the molded article may have a high temperature tensile strength of 180 MPa or more as measured at 90° C. according to standard measurement ISO 527.

Accordingly, the thermoplastic resin composition of the present invention may be used as a material for a molded article requiring excellent moldability, heat resistance, high rigidity, and high toughness.

The thermoplastic resin composition of the present invention may be applied to fields requiring high rigidity, high toughness, and weight reduction. For example, in addition to automobile parts, the thermoplastic resin composition of the present invention may be used for electrical and electronic parts, office equipment parts, and the like.

In describing the thermoplastic resin composition and the molded article, it should be noted that other conditions or equipment not explicitly described herein may be appropriately selected within the range commonly practiced in the art without particular limitation.

Exemplary embodiments of the present invention are described in detail so as for those of ordinary skill in the art to easily implement. The present invention may be implemented in various different forms and is not limited to these embodiments.

Examples

The specifications of a non-aromatic polyamide resin (A), glass fiber (B), a polyphthalamide-based resin (C), a nucleating agent (D), a flame retardant (E), and a thickener (F) used in Examples of the present invention and Comparative Examples are as follows.

(A) Non-aromatic polyamide resin (A-1) PA66 (amorphous content: 50 to 60% by weight, Tg: 50 to 60° C., Tm: 263° C., relative viscosity: 2.4)

(A-2) PA66 (amorphous content: 50 to 60% by weight, Tg: 50 to 60° C., Tm: 270° C., relative viscosity: 2.7)

(A-3) PA6 (amorphous content: 50 to 60% by weight, Tg: 45° C., Tm: 220° C., relative viscosity: 2.5)

(A-4) PA46 (amorphous content: 20 to 30% by weight, Tm: 295° C.)

(B) Glass fiber (B-1) Rigid glass fiber (circular cross section, aspect ratio (L/D): 1:1, diameter (D): 10 um): 58 to 62% by weight of silica, 14 to 18% by weight of alumina, 10 to 13% by weight of calcium oxide, 8 to 10% by weight of magnesia, 0.5 to 2% by weight of titanium dioxide, 0.5% by weight or less of $Fe_2O_3$, and 0.8% by weight or less in sum of sodium oxide and potassium oxide (B-2) Rigid glass fiber (circular cross section, aspect ratio (L/D): 1:1, diameter (D): 10 um): 62 to 66% by weight of silica, 18 to 21% by weight of alumina, 0.5 to 5% by weight of calcium oxide, 8 to 12% by weight of magnesia, 0.4 to 3% by weight of titanium dioxide, 0.1 to 0.6% by weight of $Fe_2O_3$, and 0.1 to 0.8% by weight in sum of sodium oxide and potassium oxide (B-3) general-purpose glass fiber having a circular cross section (aspect ratio (L/D): 1:1, diameter (D): 10 um): 57 to 61% by weight of silica, 11 to 15% by weight of alumina, 20 to 24% by weight of calcium oxide, 2 to 5% by weight of magnesia, 1.0% by weight or less of titanium dioxide, 0.5% by weight or less of $Fe_2O_3$, and 0.8% by weight or less in sum of sodium oxide and potassium oxide (B-4) Carbon fiber (product name: T300, Toray Co.)

(B-5) Stainless steel fiber (composite material, product name: GR75C16-E4_EN_LR)

(B-6) Wollastonite (product name: XA-600T, Koch Co.)

(B-7) Rigid glass fiber (non-circular cross section, aspect ratio (L/D): 1:3, flat type, diameter (D): 8 um): 58 to 62% by weight of silica, 14 to 18% by weight of alumina, 10 to 13% by weight of calcium oxide, 8 to 10% by weight of magnesia, 0.2 to 2% by weight of titanium dioxide, 0.6% by weight or less of $Fe_2O_3$, and 0.8% by weight or less in sum of sodium oxide and potassium oxide (B-8) general-purpose glass fiber having a non-circular cross section (aspect ratio (L/D): 1:4, flat type, diameter (D): 7 um): 52 to 56% by weight of silica, 12 to 16% by weight of alumina, 20 to 24% by weight of calcium oxide, 1.5% by weight or less of magnesia, 1.0% by weight or less of titanium dioxide, 5 to 8% by weight of $B_2O_3$, 0.7% by weight or less of fluorine (F), and 0.8% by weight or less in sum of sodium oxide and potassium oxide (B-9) Milled GF (product name: EPH-80M, Nittobo Co.)

(B-10) Glass bead (C) Polyphthalamide-based resin (C-1) Amorphous 6I (amorphous: 90% by weight or more, Tg: 106 to 150° C.)

(C-2) Amorphous 6I6T (70:30) (amorphous: less than 90% by weight, Tg: 115° C. or higher)

(D) Nucleating agent (product name: P22, BRUGGOLEN Co.)

(E) Flame retardant (product name: Exolit-OP-1230, Clariant Co.)

(F) Thickener (product name: Xibond250)

Examples 1 to 3 and Comparative Examples 1 to 6

Each component was added according to the content shown in Table 1 below, and melt-kneaded in a twin-screw extruder heated to 280 to 310° C. to prepare a resin composition in a pellet state.

The prepared pellets were dried at 120° C. for 4 hours or more, and then were injected under conditions of a mold temperature of 120° C., a hopper temperature of 290° C., and a nozzle temperature of 305° C. using a screw injection machine to obtain a specimen for evaluating mechanical properties. The physical properties of the specimen having a thickness of 4 mm, a width of 10 mm, and a mark section (elongation measurement) of 50 mm were measured in the following methods, and the results are shown in Table 1 below.

Specific gravity (unit: g/cm$^3$): Specific gravity was measured according to ISO 1183.

Tensile strength (unit: MPa): Tensile strength was measured at a room temperature (23° C.) and a high temperature (90° C.) according to ISO 527.

Elongation (unit: %): Elongation was measured according to ISO 527.

Impact strength (unit: KJ/m$^2$): Impact strength was measured according to ISO 179 (charpy).

Extrusion processability: Melt strength and breakage of yarn were visually observed, and according to the observation results, the specimens were marked as very good (◎), good (○), insufficient (Δ), or poor (X).

Injection moldability: The appearance of an injection-molded article was observed with the naked eye, and the injection-molded article was marked as very good (◎), good (○), insufficient (Δ), or poor (X), or was scored from 1 to 15. Note that, as the value decreases, the quality of appearance increases.

TABLE 1

| Classf. | Ex1 | Ex2 | Ex3 | Comp Ex1 | Comp Ex2 | Comp Ex3 | Comp Ex4 | Comp Ex5 | Comp Ex6 |
|---|---|---|---|---|---|---|---|---|---|
| A-1 | 60 | 50 | 40 | 40 | 45 | 60 | 40 | 40 | 65 |
| B-1 | 40 | 50 | 60 | — | — | — | — | — | — |
| B-2 | — | — | — | — | — | — | 50 | 40 | — |
| B-3 | — | — | — | 60 | 40 | — | — | — | — |
| B-4 | — | — | — | — | — | 40 | 10 | 20 | 30 |
| B-5 | — | — | — | — | — | — | — | — | 5 |
| B-6 | — | — | — | — | 15 | — | — | — | — |
| Spec. gravity | 1.45 | 1.55 | 1.70 | 1.70 | 1.71 | 1.23 | 1.63 | 1.59 | 1.44 |
| Room temp tensile strgth | 270 | 292 | 311 | 260 | 190 | 251 | 269 | 213 | 210 |
| Impact strngth | 18.5 | 22.5 | 21.5 | 19.0 | 7.0 | 8.7 | 10.9 | 9.4 | 8.0 |
| Elong | 3.3 | 2.7 | 2.5 | 2.0 | 1.7 | 1.8 | 1.5 | 0.8 | 1.2 |

(In Table 1, the contents of A-1, A-2, A-3, A-4, B-1, B-2, B-3, B-4, B-5, and B-6 are given in % by weight based on 100% by weight in total of the thermoplastic resin.)

As shown in Table 1, in the case of Examples 1 to 3 containing the non-aromatic polyamide resin and the glass fiber, which are essential components according to the present invention, in an appropriate composition, specific gravity was 1.45 to 1.70 g/cm$^3$, tensile strength was 270 MPa or more, elongation was 2.5 to 3.3%, and impact strength was 18.5 KJ/m$^2$ or more, showing physical property balance between high rigidity, high toughness, and specific gravity.

On the other hand, in the case of Comparative Example 1 using general-purpose glass fiber as the glass fiber, tensile strength was reduced.

In addition, in the case of Comparative Example 2 using a mixture of general-purpose glass fiber and Wollastonite as the glass fiber, in addition to tensile strength, elongation and impact strength were reduced.

In addition, in the case of Comparative Example 3 using carbon fiber instead of glass fiber as the glass fiber, mechanical properties such as tensile strength and impact strength were degraded.

In addition, in the case of Comparative Example 4 in which appropriate glass fiber was used as the glass fiber and a certain amount of carbon fiber was mixed, elongation and impact strength were reduced. In the case of Comparative Example 5 in which the content of carbon fiber was increased, in addition to elongation and impact strength, tensile strength was reduced.

In the case of Comparative Example 6 using a mixture of carbon fiber and stainless steel fiber instead of glass fiber as the glass fiber, mechanical properties such as tensile strength, elongation, and impact strength were degraded.

Examples 4 to 6 and Comparative Examples 7 and 8

Specimens were prepared in the same manner as in Example 1, except that each component was added according to the contents shown in Table 2 below. The physical properties of the specimens were measured in the same manner as in Example 1, and the results are shown in Table 2 below.

TABLE 2

| Classification | Example 4 | Example 5 | Example 6 | Comparative Example 7 | Comparative Example 8 |
|---|---|---|---|---|---|
| A-1 | 36 | 20 | — | — | — |
| A-2 | — | — | 32 | — | — |
| A-3 | — | — | — | — | 40 |
| A-4 | — | — | — | 34 | — |
| B-1 | 60 | 60 | 60 | — | — |
| B-2 | — | — | — | 50 | 60 |
| C-1 | 4 | 20 | 8 | 6 | — |
| Room temperature tensile strength | 310 | 303 | 315 | 275 | 285 |
| Elongation | 2.5 | 2.3 | 2.6 | 1. 8 | 2.3 |
| Injection moldability | 6 | 4 | 5 | 8 | 7 |
| Extrusion processability | ◎ | ○ | ◎ | X | Δ |

(In Table 2, the contents of A-1, A-2, A-3, A-4, B-1, B-2, B-3, B-4, B-5, B-6, C-1, and C-2 are given in % by weight based on 100% by weight in total of the thermoplastic resin.)

As shown in Table 2, in the case of Examples 4 to 6 including the non-aromatic polyamide resin and the glass fiber, which are essential components according to the present invention, and the polyphthalamide-based resin in an appropriate composition, tensile strength was 303 MPa or more, and elongation was 2.3 to 2.6%, showing that a molded article had excellent appearance. In addition, physical property balance between high rigidity, high toughness, processability, and injection moldability was confirmed.

On the other hand, in the case of Comparative Example 7 using a non-aromatic polyamide resin having inadequate glass transition temperature and melting temperature, injection moldability, extrusion processability, tensile strength, and elongation were degraded.

In addition, in the case of Comparative Example 8 using a mixture of a non-aromatic polyamide resin having inadequate glass transition temperature and melting temperature and rigid glass fiber, in addition to injection moldability and tensile strength, extrusion processability and elongation were deteriorated.

Examples 7 to 9 and Comparative Examples 9 to 18

Specimens were prepared in the same manner as in Example 1, except that each component was added according to the contents shown in Table 3 below. The physical properties of the specimens were measured in the same manner as in Example 1, and the results are shown in Table 3 below.

Note that, the physical property degradation rate (unit: %) shown in Table 3 below was obtained by performing measurement at room temperature (23° C.), performing measurement at high temperature (90° C.), and then calculating the degree of degradation in physical properties at high temperature compared to room temperature by Equation 1.

$$100-(\text{High temperature measurement value}/\text{Room temperature measurement value}\times 100) \quad \text{[Equation 1]}$$

(In Table 3, the contents of A-1, A-2, A-3, A-4, B-1, B-2, B-3, B-4, B-5, B-6, C-1, and C-2 are given in % by weight based on 100% by weight in total of the thermoplastic resin, and the contents of D, E, and F are given in parts by weight based on 100 parts by weight in total of the thermoplastic resin.) As shown in Table 3, in the case of Examples 7 to 9 including the non-aromatic polyamide resin and the glass fiber, which are essential components according to the present invention, the polyphthalamide-based resin, and additives in appropriate compositions, room temperature tensile strength was 300 to 320 MPa, high temperature tensile strength was 180 MPa or more, extrusion processability was excellent, and physical property degradation rate was 40% or less, showing physical property balance between high rigidity, high toughness, processability, and thermal properties.

On the other hand, in the case of Comparative Example 9 using a small amount of a non-aromatic polyamide resin having inadequate glass transition temperature and melting temperature, injection moldability and room temperature tensile strength were degraded.

In addition, in the case of Comparative Example 10 using a small amount of appropriate glass fiber, room temperature tensile strength was poor.

In addition, in the case of Comparative Examples 11 and 12, in which a small amount of an appropriate non-aromatic polyamide resin was used and an inappropriate polyphthalamide-based resin was mixed, according to the content of the polyphthalamide-based resin, extrusion processability and room temperature tensile strength were poor, or room temperature tensile strength, high temperature tensile strength, and physical property degradation rate were degraded. In addition, in the case of Comparative Example 14 using an appropriate non-aromatic polyamide resin and including a non-aromatic polyamide resin having inappropriate glass transition temperature and melting temperature,

TABLE 3

| Clas | Ex 7 | Ex 8 | Ex 9 | Com Ex 9 | Com Ex 10 | Com Ex 11 | Com Ex 12 | Com Ex 13 | Com Ex 14 | Com Ex 15 | Com Ex 16 | Com Ex 17 | Com Ex 18 |
|---|---|---|---|---|---|---|---|---|---|---|---|---|---|
| A-1 | 31 | 37 | 40 | — | 60 | 12 | — | — | 33.8 | 32 | 34 | 33.8 | 35 |
| A-2 | — | — | — | — | — | — | — | — | — | — | — | — | — |
| A-3 | — | — | — | 34 | — | — | — | — | — | — | — | — | — |
| A-4 | — | — | — | — | — | — | — | 40 | — | — | — | — | — |
| B-1 | 65 | 55 | 60 | 60 | 35 | 60 | 60 | 60 | 60 | 60 | 60 | 60 | 60 |
| C-1 | 4 | 8 | — | 6 | 5 | — | — | — | 6 | 5 | 5 | 6 | 5 |
| C-2 | — | — | — | — | — | 28 | 40 | — | — | — | — | — | — |
| D | — | — | — | — | — | — | — | — | 0.2 | 2 | — | — | — |
| E | — | — | — | — | — | — | — | — | — | — | 1 | | |
| F | — | — | — | — | — | — | — | — | — | — | — | 0.2 | 5 |
| Room temp tens str | 300 | 320 | 306 | 285 | 240 | 276 | 270 | 270 | 295 | 270 | 260 | 289 | Not measurable |
| High temp tens str | 180 | 180 | 200 | — | — | 115 | 180 | — | 165 | — | 130 | 151 | |
| Inj mldabiliy | — | — | — | — | ◎ | — | ◎ | — | — | — | — | — | — |
| Extru prcssablty | ◎ | ◎ | ○ | ○ | ○ | ○ | Δ | X | ○ | Δ | X | Δ | X |
| Phys prop degrarate | 40 | 43.75 | 34.64 | — | — | 58.33 | 33.33 | — | 44.06 | — | 47.75 | — | — |

high temperature tensile strength and physical property degradation rate were degraded.

In addition, in the case of Comparative Example 13 using a non-aromatic polyamide resin having inappropriate glass transition temperature and melting temperature, extrusion processability and room temperature tensile strength were poor.

In addition, in Comparative Examples 15 to 18, when a small amount of a non-aromatic polyamide resin having inappropriate glass transition temperature and melting temperature was used, the effects of additives were evaluated. In the case of Comparative Example 15 using an excess of a nucleating agent, extrusion processability and room temperature tensile strength were poor. In the case of Comparative Example 16 using a flame retardant, extrusion processability, room temperature tensile strength, high temperature tensile strength, and physical property degradation rate were reduced. In the case of Comparative Example 17 using a small amount of a thickener, extrusion processability was degraded, and high temperature tensile strength and physical property degradation rate were poor. In the case of Comparative Example 18 using an excess of a thickener, extrusion processability was poor, and tensile strength and physical property degradation rate could not be measured. It can be seen that introduction of additives such as heat-resistant stabilizers and flame retardants has little effect on improving high temperature properties and reduces extrusion processability.

Examples 10 to 13 and Comparative Examples 19 to 22

Specimens were prepared in the same manner as in Example 1, except that each component was added according to the contents shown in Table 4 below. The physical properties of the specimens were measured in the same manner as in Example 1, and the results are shown in Table 4 below.

Note that, MD orientation and TD orientation shown in Table 4 below are the measurement results of physical properties according to glass fiber orientation (unit: MPa) for MD (flow direction) and TD (perpendicular direction) according to ASTM D638 Type 1. At this time, specimen thickness was 3.2 mm, specimen width was 12.7 mm, marked section (elongation measurement) was 50 mm, and measurement rate was 5 mm/min.

TABLE 4

| Classif | Ex 10 | Ex 11 | Ex 12 | Ex 13 | Comp Ex19 | Comp Ex20 | Comp Ex21 | Comp Ex22 |
|---|---|---|---|---|---|---|---|---|
| A-1 | 36 | 20 | 34 | 40 | 40 | 32 | 20 | 40 |
| B-1 | 60 | — | — | — | — | 50 | 55 | — |
| B-3 | — | — | — | — | 60 | — | — | — |
| B-7 | — | 60 | — | — | — | — | — | — |
| B-8 | — | — | 60 | 60 | — | — | — | 50 |
| B-9 | — | — | — | — | — | 10 | — | 10 |
| B-10 | — | — | — | — | — | — | 5 | — |
| C-1 | 4 | 20 | 6 | — | — | 8 | 20 | — |
| MD orient | 225 | 235 | 250 | 240 | 190 | 205 | 210 | 230 |
| TD orient | 120 | 140 | 165 | 150 | 95 | 100 | 110 | 125 |
| Room temp tensile strength | 310 | 300 | 305 | 300 | 260 | 280 | 275 | 273 |
| Elong | 2.5 | 2.2 | 2.5 | 2.3 | 2.0 | 2.8 | 2.9 | 2.6 |

(In Table 4, the contents of A-1, A-2, A-3, A-4, B-1, B-2, B-3, B-4, B-5, B-6, C-1, and C-2 are given in % by weight based on 100% by weight in total of the thermoplastic resin.)

As shown in Table 4, under the condition that the non-aromatic polyamide resin and the glass fiber, which are essential components according to the present invention, and the polyphthalamide-based resin were included, physical properties were evaluated according to the cross-sectional shapes of the glass fiber. When the non-aromatic polyamide resin, the glass fiber, and the polyphthalamide-based resin were included within an appropriate composition range, in the case of Example 10 in which the glass fiber had a circular cross section and Examples 11 and 12 in which the glass fiber had a non-circular cross section, according to the cross-sectional shape and aspect ratio of the glass fiber, physical property deviation between MD (flow direction) and TD (perpendicular direction) was minimized. Thus, room temperature tensile strength was 300 to 310 MPa, and elongation was 2.2 to 2.5%, showing physical property balance between high toughness and processability.

In addition, in the case of Example 13 not including the polyphthalamide-based resin, according to the cross-sectional shape and aspect ratio of fiber, physical property deviation between MD (flow direction) and TD (perpendicular direction) was minimized. Thus, room temperature tensile strength was 300 MPa, and elongation was 2.3%, showing physical property balance between high toughness and processability.

On the other hand, in the case of Comparative Example 19 using a general-purpose glass fiber having a circular cross section, the orientation, tensile strength, and elongation of glass fiber were degraded.

In addition, in the case of Comparative Examples 20 to 22 using appropriate glass fiber but having inappropriate types including glass beads, the orientation and tensile strength of glass fiber were poor. Even though the orientation of the glass fiber was appropriate, the tensile strength thereof was reduced.

In conclusion, when resin reinforcement is performed by adding, in a specific composition ratio, glass fiber, an aromatic polyamide resin, additives, and the like to a non-aromatic polyamide resin having specified glass transition temperature and melting temperature disclosed in the present invention, the composition and shape of glass fiber may be controlled, and thus physical property balance between processability, specific gravity, and rigidity of the resin may be realized, thereby providing a molded article capable of replacing lightweight metal parts for automobiles.

The invention claimed is:

1. A thermoplastic resin composition, comprising:

31 to 41% by weight, based on the total weight of the resin composition, of a non-aromatic polyamide resin having a glass transition temperature (Tg) of 50 to 60° C. and a melting temperature (Tm) of 240 to 265° C.;

36 to 65% by weight, based on the total weight of the resin composition, of glass fiber having a silica content of 52 to 66% by weight, based on the total weight of the glass fiber; and 4 to 25% by weight of an aromatic polyamide resin, based on the total weight of the resin composition, wherein the aromatic polyamide resin is polyhexamethylene isophthalamide (PA6I), and wherein the aromatic polyamide resin has a glass transition temperature (Tg) of 117 to 120° C., wherein the thermoplastic resin composition has a room temperature tensile strength of 270 MPa or more, together with a high temperature tensile strength of 180 MPa or more measured at 90° C., as measured according to standard measurement ISO 527, and wherein, a physical property degradation rate (%) calculated using room temperature (23° C.) tensile strength and high temperature (90° C.) tensile strength according to standard measurement ISO 527 of the thermoplastic resin composition satisfies Equation 4, $$34 \leq 100-(\text{high temperature measurement value/room temperature measurement value} \times 100) \leq 44 \quad \text{[Equation 4]}.$$

2. The thermoplastic resin composition according to claim 1, wherein the thermoplastic resin composition satisfies Equations 1 to 3 below, $$4.8a \leq c \leq 5.3a, \quad \text{[Equation 1]}$$

$$2d \leq b \leq 2.5d, \text{ and} \quad \text{[Equation 2]}$$

$$a < b < c, \quad \text{[Equation 3]}$$

wherein a is a glass transition temperature (Tg) of the non-aromatic polyamide resin, b is a glass transition temperature (Tg) of the aromatic polyamide resin, c is a melting temperature (Tm) of the non-aromatic polyamide resin and d is a content of silica contained in the glass fiber, wherein a, b, c, and d satisfy $50 \leq a \leq 60$, $117 \leq b \leq 120$, $240 \leq c \leq 265$, and $52 \leq d \leq 66$, respectively.

3. The thermoplastic resin composition according to claim 1, wherein the glass fiber comprises 52 to 66% by weight of silica, 12 to 21% by weight of alumina, 0.5 to 24% by weight of calcium oxide, 12% by weight or less of magnesia, 0 to 8% by weight of boron trioxide, 3% by weight or less of titanium dioxide, 0 to 0.6% by weight of $Fe_2O_3$, 0 to 8% by weight of boron oxide, 0 to 0.7% by weight of fluorine (F), and 0.8% by weight or less in sum of sodium oxide and potassium oxide, based on the total weight of the glass fiber.

4. The thermoplastic resin composition according to claim 1, wherein the glass fiber comprises 52 to 56% by weight of silica, 12 to 16% by weight of alumina, 20 to 24% by weight of calcium oxide, 1.5% by weight or less of magnesia, 1% by weight or less of titanium dioxide, 0.8% by weight or less in sum of sodium oxide and potassium oxide, 0.4% by weight or less of $Fe_2O_3$, 5 to 8% by weight of boron oxide, and 0.7% by weight or less of fluorine (F), based on the total weight of the glass fiber.

5. The thermoplastic resin composition according to claim 1, wherein the glass fiber contains 17 to 24% by weight in sum of calcium oxide and magnesium, based on the total weight of the glass fiber, and has a circular cross section.

6. The thermoplastic resin composition according to claim 1, wherein the glass fiber is flat glass fiber containing 21 to 25% by weight in sum of calcium oxide and magnesium, based on the total weight of the glass fiber, and has a non-circular cross section.

7. The thermoplastic resin composition according to claim 1, wherein the glass fiber has an aspect ratio of 1:1 to 1:4 expressed as a ratio (L/D) of length (L) to diameter (D), wherein the diameter (D) is an average diameter of 6 to 16 um.

8. The thermoplastic resin composition according to claim 1, further comprising 5% by weight or less of one or more additives selected from a flame retardant, a nucleating agent, a heat stabilizer, a light stabilizer, a lubricant, an antioxidant, and a thickener, based on a total weight of the thermoplastic resin composition.

9. A method of preparing a thermoplastic resin composition, comprising melt-kneading and extruding 31 to 41% by weight of a non-aromatic polyamide resin having a glass transition temperature (Tg) of 50 to 60° C. and a melting temperature (Tm) of 240 to 265° C.; 36 to 65% by weight of glass fiber having a silica content of 52 to 66% by weight; and 4 to 25% by weight of an aromatic polyamide resin, based on the total weight of the resin composition, wherein the aromatic polyamide resin is polyhexamethylene isophthalamide (PA6I), and wherein the aromatic polyamide resin has a glass transition temperature ($T_g$) of 117 to 120° C.

wherein the thermoplastic resin composition has a room temperature tensile strength of 270 MPa or more, together with a high temperature tensile strength of 180 MPa or more measured at 90° C., as measured according to standard measurement ISO 527, wherein, a physical property degradation rate (%) calculated using room temperature (23° C.) tensile strength and high temperature (90° C.) tensile strength according to standard measurement ISO 527, the thermoplastic resin composition satisfies Equation 4 below, $$34 \leq 100-(\text{high temperature measurement value/room temperature measurement value} \times 100) \leq 44 \quad \text{[Equation 4]}.$$

10. A molded article manufactured using the thermoplastic resin composition according to claim 1.

* * * * *